United States Patent [19]

Towle et al.

[11] Patent Number: 5,104,942

[45] Date of Patent: Apr. 14, 1992

[54] PREPARATION OF SIDE-CHAIN POLYMERS

[76] Inventors: Ian H. Towle, 2 Barn Way, Stratton, Cirencester, Gloucestershire; Robert Lines, 142 Ridge Nether Moor, Liden, Swindon, Wiltshire, both of England

[21] Appl. No.: 332,405

[22] Filed: Mar. 28, 1989

Related U.S. Application Data

[63] Continuation of Ser. No. 899,460, Aug. 22, 1986, abandoned.

[30] Foreign Application Priority Data

Aug. 27, 1985 [GB] United Kingdom ............ 8521325

[51] Int. Cl.$^5$ .................................................. C08F 8/42
[52] U.S. Cl. ........................... 525/359.3; 525/326.5; 525/326.6; 525/329.8; 525/359.4; 525/457; 525/474
[58] Field of Search ............... 525/359.3, 359.4, 474, 525/457

[56] References Cited

U.S. PATENT DOCUMENTS

| | | | |
|---|---|---|---|
| 1,880,559 | 10/1932 | Webber . | |
| 2,435,429 | 8/1943 | Evans | 260/75 |
| 3,153,010 | 10/1964 | Jenkins et al. | 260/75 |
| 3,194,791 | 7/1965 | Wilson et al. | 260/75 |
| 3,330,872 | 7/1967 | Weesner | 260/615 |
| 3,408,334 | 10/1968 | Cadwell et al. | 260/78 |
| 3,450,797 | 6/1969 | Schäfer et al. | 525/359.3 |
| 3,480,656 | 11/1969 | Heiss | 260/429.7 |
| 3,551,394 | 12/1970 | Sakuragi et al. | 525/359.3 |
| 3,703,564 | 11/1972 | White | 260/360 |
| 3,849,513 | 11/1974 | Doyle | 525/359.3 |
| 3,898,196 | 8/1975 | Keck | 260/75 H |
| 3,995,094 | 11/1976 | Crosby et al. | 525/359.3 |
| 4,129,594 | 12/1978 | Baker et al. | 260/544 |
| 4,137,386 | 1/1979 | Smith | 525/359.3 |
| 4,334,042 | 6/1982 | Matsumoto et al. | 525/340 |
| 4,358,568 | 11/1982 | Fox et al. | 525/439 |
| 4,375,357 | 3/1983 | Wingard, Jr. et al. . | |
| 4,485,833 | 12/1984 | Uraneck et al. | 525/340 |
| 4,611,049 | 9/1986 | Kuratsuji et al. | 528/279 |
| 4,677,153 | 6/1987 | Kitahara et al. | 525/359.3 |

FOREIGN PATENT DOCUMENTS

| | | |
|---|---|---|
| 786853 | 4/1968 | Canada . |
| 29362 | 5/1981 | European Pat. Off. . |
| 50821 | 5/1982 | European Pat. Off. . |
| 0079157 | 5/1983 | European Pat. Off. . |
| 154506 | 9/1985 | European Pat. Off. . |
| 1058341 | 3/1954 | France . |
| 1041613 | 7/1966 | United Kingdom . |
| 1044015 | 9/1966 | United Kingdom . |
| 1064026 | 4/1967 | United Kingdom . |
| 1137151 | 12/1968 | United Kingdom . |
| 1499053 | 1/1978 | United Kingdom . |
| 2116982 | 10/1983 | United Kingdom . |

OTHER PUBLICATIONS

Chem. Abs. 77:139625r (abstract of JP 72-27,502).
Chem. Abs. 53:22096A (abstract of FR 1,058,341).
World Patent Index WPI 82-63906E/31 (abstract of EP 56,501).
World Patent Index WPI 81-25669D/15, (abstract of DE 2,939,782 A1).
Valade et al., Chimie Organique, Seauce du 21 Mai 1962, p. 3693.
World Patent Index WPI 72-53901T/34 (Abstract of FR 2,124,371).
World Patent Index WPI 80-64330C/37 (Abstract of DE 2,907,613).
World Patent Index WPI 77-67170Y/38 (Abstract of FR 2,343,771).
World Patent Index WPI 72-61414T/39 (Abstract of FR 2,128,559).
World Patent Index WPI 80-84729C/48 (Abstract of FR 2,456,124).
World Patent Index WPI 78-68971A/39 (Abstract of DE 2,823,297).
Kricheldorf et al., Polym. Bull. 1,383 (1979).
Chem. Abs. 72:12133v (1970) (Abstract of FR 1,566,217).
Chem. Abs. 70:115281e (1969) (Abstract of Bull. Soc. Chim. Fr. 1969, pp. 262-263).

*Primary Examiner*—Bernard Lipman
*Attorney, Agent, or Firm*—Yuan Chao; Herbert Burkard

[57] ABSTRACT

A method for adding ester side groups, e.g. liquid crystalline groups, to a polymer backbone using tin chemistry.

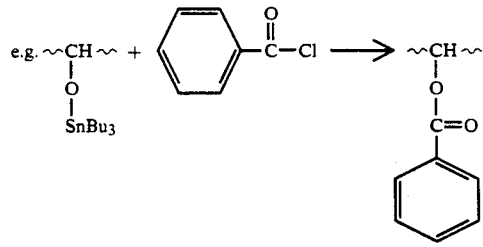

The method is particularly useful for adding side groups to a polymer that contains thermally sensitive groups, such as epoxy groups, as the reaction can be carried out at relatively low temperatures.

Claims are to
(a) a method of adding side units to a polymer;
(b) a polymer containing the side units - SnBu$_3$;
(c) specific polymers.

9 Claims, No Drawings

PREPARATION OF SIDE-CHAIN POLYMERS

This application is a continuation of application Ser. No. 06/899,460, filed Aug. 22, 1986 now abandoned.

This invention relates to a method of adding side units to a polymer to form side chain polymers, and especially adding side units comprising moieties containing carbonyl groups.

Known methods of preparing side chain polymers include first adding the side unit to a monomer and then polymerising the monomer to form the polymer. This method has the disadvantage that the polymerisation reaction may adversely affect the side chains. Alternatively the polymer can first be prepared and then the desired side units added to the polymer. This method often requires high temperatures, particularly when carbonyl-containing moieties are added, for example by an ester exchange reaction, which may damage any thermally sensitive groups in the polymer backbone or in the moiety to be added as a side unit to the polymer.

The present invention provides a method for adding one or more side units to a polymer which comprises reaction of an organo-metallic group of the formula:

where
  each R is independently a substituted or unsubstituted alkyl or aryl group;
  M is an element selected from Group IIIB, IVB or VB of the Periodic Table (IUPAC 1965 revision) or a transition metal, excluding carbon, silicon, nitrogen, phosphorus, boron, aluminium and titanium; and
  r is an integer from 1 to 4 depending upon the element M used, with a second group of the formula:

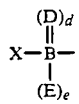

where
  X is a halogen atom or a group capable of reacting with the first compound to eliminate a compound containing M and X;
  B is an atom selected from carbon, phosphorus, sulphur or silicon;
  D is an oxygen or sulphur atom or an amine group;
  d is 1 if B is carbon, zero or 1 if B is phosphorus, zero, 1 or 2 if B is sulphur or zero if B is silicon;
  E is selected from an aromatic group, aliphatic group, —OR' or —NR'$_2$ if B is phosphorus, or from an aromatic group, aliphatic group or —OR' if B is silicon, where R' is a substituted or unsubstituted alkyl or aryl group;
  e is zero if B is carbon or sulphur, 1 if B is phosphorus or 2 if B is silicon,
either the organo-metallic group or the second group being bonded to the polymer before the said reaction, and the other of those groups being bonded to a moiety A, the said reaction eliminating the compound (R)$_r$MX and producing a polymer having at least one side group or side chain comprising a unit of the formula:

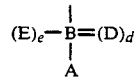

In one aspect of the invention the organo-metallic group is bonded to the polymer before the said reaction. Thus the reaction comprises reaction of a polymer having at least one intermediate side group or chain comprising a unit of the formula:

with a second compound of the formula:

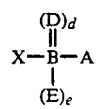

the reaction eliminating the compound (R)$_r$MX and producing a polymer having at least one side group or chain comprising a unit of the formula:

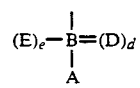

Where the polymer backbone comprises a silicon-based polymer, such as a siloxane, the element M of the organo-metallic group may be bonded directly to a silicon atom in the polymer backbone. Where the polymer backbone comprises a carbon-based polymer it is preferred that the element M is bonded to a side atom or group of the polymer before the said reaction to form an intermediate side group or chain comprising a unit of the formula:

where Y' is an oxygen atom, a sulphur atom, a or a substituted nitrogen atom other

or a substituted phosphorus atom other than

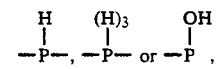

preferably an oxygen atom.

the said reaction then producing a polymer having at least one side group or chain comprising a unit of the formula:

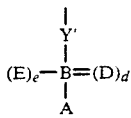

The atom Y' in the intermediate and resulting unit may be bonded directly to the polymer backbone, for example to a carbon or silicon atom in the backbone, or it may comprise the end of a side group or chain that forms part of the polymer before the said reaction.

Preferably the organo-metallic group and the second group are reacted together in a stoichiometric ratio of 1:1, the reaction being a type of condensation reaction.

The element M in the organo-metallic group $(R)_rM$- is preferably selected from Group IVB of the Periodic Table, and preferably is in oxidation state (+4). More preferably M is either tin or germanium, and tin (+4) is especially preferred.

Suitable groups for R include unsubstituted alkyl groups such as methyl, ethyl, propyl, butyl, pentyl, octyl etc., substituted alkyl groups such as benzyl or phenylethyl, or a substituted or unsubstituted aryl group such as phenyl, naphthyl or biphenyl. Preferably, however, R is an unsubstituted alkyl group containing from 1 to 4 carbon atoms, an n-butyl group being especially preferred. The number, r, of R groups attached to the element M depends upon the valency of the element M used; for example when M is tin (+4) then r is 3.

Thus the organo-metallic group $(R)_rM$- is preferably $(Bu)_3Sn$-.

In the second group

X is preferably a halogen atom and more preferably a chlorine atom. It is preferred that B is a carbon atom and D is an oxygen atom, such that the second group is preferably an acid chloride group,

Thus it is preferred that the reaction according to the first aspect of the invention comprises reaction of a polymer having at least one intermediate side group or chain comprising the unit:

with an acid chloride compound of the formula

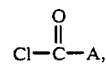

the reaction eliminating the compound $(Bu)_3SnCl$ and producing a polymer having at least one side group or chain comprising a unit of the formula:

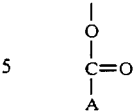

The organo-metallic group $(R)_rM$- may be bonded to the polymer before the said reaction by a number of different methods. For example, where the organometallic group is $(Bu)_3Sn$-, this may be bonded to the polymer by reaction of an organo-metallic compound of the formula $[(Bu)_3Sn]_2O$ or $(Bu)_3SnOR'$ where R' is a substituted or unsubstituted alkyl or aryl group, with a side group or chain- of the polymer comprising the group —OH or

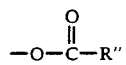

where R" is a substituted or unsubstituted- alkyl or aryl group or a hydrogen atom preferably an acyl group, the reaction producing a polymer having at least one intermediate side group or chain comprising the unit:

The moiety A may be any of a variety of different moieties. It may be an aromatic, aliphatic, aromatic-/alipatic, heterocyclic, alicyclic, siloxyl or silane moiety. This includes substituted or unsubstituted moieties, heteoaromatic, heteroaliphatic and multiple aromatic moieties. Where the moiety contains aromatic groups, these may be joined by an oxygen or sulphur atom or sulphone, imide or ketone group for example. The bond between the atom B and the moiety A may be between B and a carbon atom, which may be aromatic or aliphatic, or a silicon atom, or may be between B and an atom such as oxygen, sulphur, nitrogen or phosphorus. Hereinafter where it is specifically preferred that the bond between the atom B is between B and an oxygen, sulphur, nitrogen or phosphorus atom, the moiety A shall be represented by the formula -Y-A' where Y is an oxygen atom, a sulphur atom, a substituted nitrogen atom other than

or a substituted phosphorus atom other than

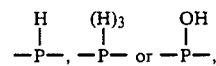

and A' is the remainder of the moiety. However, it is understood that where the moiety is represented solely by "A" then this includes moieties of the formula -Y-A'.

In another aspect of the invention the second group is bonded to the polymer before the said reaction, the said reaction comprising reaction of an organo-metallic compound of the formula:

$(R)_rM-Y-A'$ with a polymer having at least one intermediate side group or chain comprising a unit of the formula:

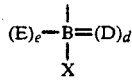

the reaction eliminating the compound $(R)_rMX$ and producing a polymer having at least one side group or chain comprising a unit of the formula:

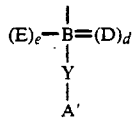

The reaction is a type of condensation reaction with the organo-metallic group and the intermediate group or chain being reacted together in a stoichiometric ratio of 1:1. The atom B may be bonded directly to the polymer backbone, or it may comprise the end of a side group or chain that forms part of the polymer before the said reaction. The preferred element, atoms and groups for M, R, r, B, D, d, E, e and X are as stated for the first aspect of the invention. Preferably, Y is an oxygen atom and -Y-A' may be any one of the type of moieties described above for the moiety A provided that it contains an oxygen, sulphur, nitrogen or phosphorus atom, Y, which can be bonded to the atom B.

Thus it is preferred that the reaction according to the second aspect of the invention comprises reaction of an organo-metallic compound of the formula:

$(Bu)_3SnO-A'$ with a polymer having at least one intermediate side group or chain comprising a unit of the formula:

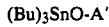

the reaction eliminating the compound $(Bu)_3SnCl$ and producing a polymer having at least one side group or chain comprising a unit of the formula:

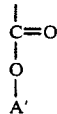

The method of the invention, according to either aspect, has a number of advantages over known methods of adding side units onto polymers. For example, the reaction according to the invention can occur at relatively low temperatures usually between −30 degrees and 150 degrees celsius, although higher and lower temperatures can also be used. The use of low temperatures enables thermally sensitive groups to be included in the side units, and any thermally sensitive groups present in the polymer backbone are not adversely affected by the reaction. Examples of these thermally sensitive groups included unsaturated groups such as carbon-carbon double bonds, and epoxy groups.

Another advantage is that the reagents and solvents used in the reaction can be chosen to be relatively non-hazardous. Also the eliminated compound, or by-product, $(R)_rMX$, of the reaction is generally soluble in many solvents making purification of the resulting side chain polymer an unusually easy task. Furthermore this by-product may form a starting reagent for the preparation of the organo-metallic group or compound.

The atom B may be bonded directly to the polymer backbone, for example to a carbon or silicon atom in the backbone, or it may comprise the end of a side group or chain that forms part of the polymer before the said reaction.

The invention will now be illustrated by the following Examples.

EXAMPLE 1

To 20g of Epikote 1007 (available from Shell Chemicals (UK) Ltd.) was added 23g of bis(tributyl stannyl) oxide in 200ml of $CO_2$ free chlorobenzene. The mixture was heated to boiling and the water of reaction removed using a Dean-Stark head. After 3 hours all the water had been removed. After allowing the clear solution to cool to room temperature 11g of benzoyl chloride in 50mls of $CO_2$ free chlorobenzene was added and the reaction mixture heated to reflux for 1 hour. The modified polymer was precipitated into methanol and recovered by filtration. Residual tributyltin chloride was removed by extraction with methanol.

The infra-red spectrum of the isolated polymer showed that no residual hydroxyl groups, the presence of aliphatic/aromatic ester and that the terminal epoxy functions, present in the unmodified material, still to be present.

The $^{13}C$ and $^1H$ n.m.r. spectra of the material confirmed the structure as;

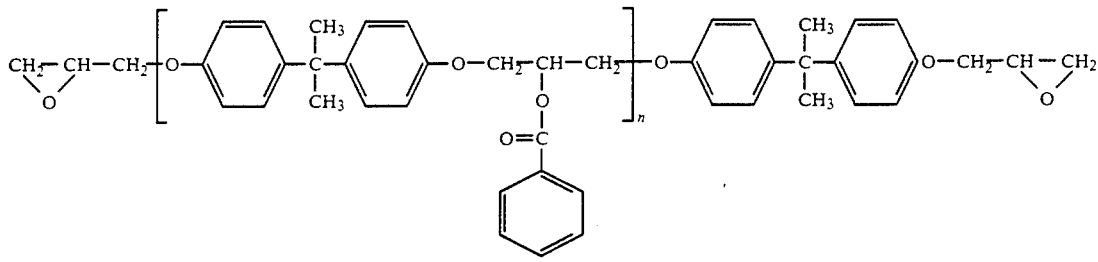

EXAMPLE 2

The experiment as described in Example 1 was repeated with the exception that the benzoyl chloride was replaced by 3,5-dinitrobenzoyl chloride.

The structure of this material was confirmed by $^{13}C$ and $^{1}H$ n.m.r. spectroscopy as;

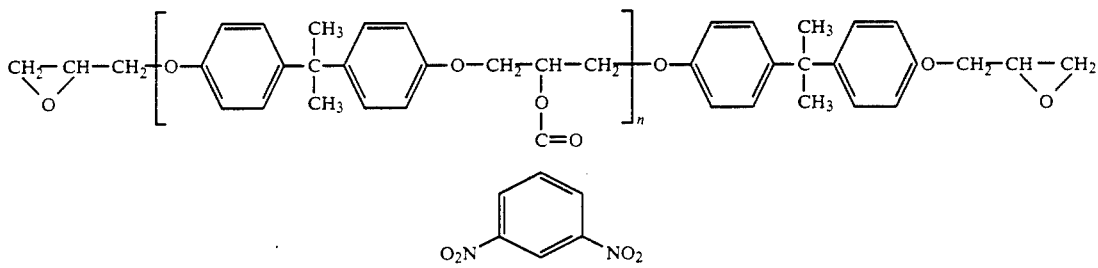

EXAMPLE 3

To 15g of Cellulosetriacetate in 200 mls of chlorobenzene was added 16.1g of tributylstannylmethoxide. The mixture was heated to boiling and methyl acetate removed using a Perkin-Triangle fractionation column. After all the methyl acetate had been removed the reaction was allowed to cool to room temperature. Once cool 7.1g of benzoyl chloride in 50ml of chlorobenzene was added. The mixture was then heated to reflux for 1 hour. The modified polymer was precipitated into methanol and collected by filtration. Residual tributyltin chloride was removed by extraction with methanol.

The infra-red spectrum of the isolated polymer showed no residual acetate groups and that they had been replaced by benzoyl units.

The $^{13}C$ and $^{1}H$ n.m.r. spectra of the material confirmed the structure as:

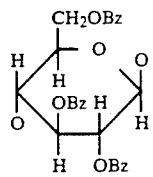

where Bz represents the group

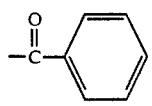

EXAMPLE 4

To 150mls of xylene was added 5.6g of 4-phenylphenol and 10.57g of tributyltinmethoxide. The reaction mixture was heated to boiling and methanol removed. Once all had been removed heating was discontinued and when refluxing had subsided 2.98g of polyacryloyl chloride added. The mixture was heated to reflux for 3 hours and allowed to cool. The resultant polymer was precipitated into methanol, washed with fresh methanol and dried.

Yield 7.2g., 97 percent.

The product was identified to be a polymer containing units of the formula:

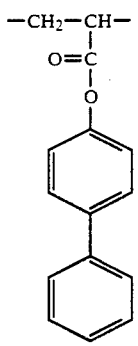

EXAMPLE 5

Polyvinyl acetate (available from Aldrich Chemical Co.), 0.1 M, was dissolved in 100 ml of chlorobenzene by stirring at room temperature for a few hours. To this solution was then added 0.11 mol of tributylstannylmethoxide and the mixture refluxed under reduced pressure for a few hours. The reaction evolved methyl acetate which was removed using a U-tube cooled in liquid nitrogen. After the evolution of methyl acetate was complete, the reaction mixture was cooled to room temperature and 0.11 mol of 3,5-dinitrobenzoylchloride dissolved in chlorobenzene was added dropwise. The reaction mixture was stirred for one hour and then poured into hexane (ca.500ml) to precipitate the product.

The product was identified by ¹H n.m.r. spectroscopy to be a polymer containing units of the formula:

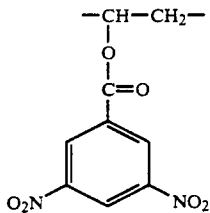

EXAMPLE 6

The reaction described in Example 5 was repeated with the exception that the 3,5-dinitrobenzoyl chloride was replaced by 4-fluorobenzoylchloride. The product was identified by ¹H n.m.r. spectroscopy to be a polymer containing units of the formula:

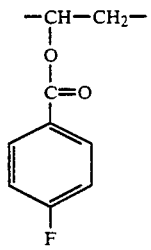

EXAMPLE 7

The reaction described in Example 5 was repeated with the exception that the 3,5-dinitrobenzoyl chloride was replaced by benzoyl chloride. The product was identified by ¹H n.m.r. spectroscopy to be a polymer containing units of the formula:

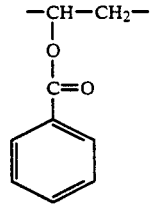

EXAMPLE 8

The reaction described in Example 5 was repeated with the exception that the 3,5-dinitrobenzoyl chloride was replaced by benzoyl chloride, and the tributylstannylmethoxide was replaced by triethylstannayl methoxide. The product was identified by ¹H n.m.r. spectroscopy to be a polymer containing units of the formula:

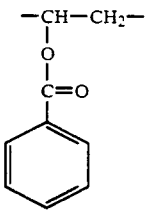

We claim:

1. A method of attaching a side chain or group

to a polymer, comprising reacting a polymer having an organometallic group

attached to a silicon atom in the polymer backbone or attached to group Y' which group Y' is attached to a carbon atom in the polymer backbone,
where each R is independently an alkyl or aryl group;
M is an element selected from the group consisting of gallium, indium, thallium, germanium, tin, lead, arsenic, antimony, and bismuth;
r is an integer from 1 to 4 depending on the element M used; and
Y' is an oxygen atom or a sulfur atom;
with a compound of the formula

where
X is a halogen atom and
A is an aromatic, aliphatic, aromatic/aliphatic, or heterocyclic moiety; thereby eliminating the compound (R)$_r$M- and attaching to said polymer a side chain or group

2. A method according to claim 1 wherein Y' is oxygen.
3. A method according to claim 1, wherein M is germanium, tin or lead.
4. A method according to claim 3 wherein M is tin.
5. A method according to claim 4 wherein r is 3.
6. A method according to claim 1 wherein R is an alkyl group containing 1 to 4 carbon atoms.
7. A method according to claim 6 wherein R is n-butyl.
8. A method accoridng to claim 1, wherein M is tin, Y' is oxygen and the group (R)$_r$M- was bonded to the polymer by the reaction of an organo-metallic compound of the formula

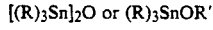

where R' is a substituted or unsubstituted alkyl or aryl group, with a group

in the polymer, where R" is a substituted or unsubstituted alkyl or aryl group or a hydrogen atom.
9. A method according to claim 1, wherein the polymer to which said side chain or group is attached is an epoxy resin, cellulose triacetate, or poly(vinyl acetate).

* * * * *